United States Patent [19]
Girauldon

[11] 3,949,839
[45] Apr. 13, 1976

[54] FIXED SUPPORT FOR A DISC BRAKE

[75] Inventor: Jean-Claude Girauldon, Ponthierry, France

[73] Assignee: Societe Anonyme D.B.A., Paris, France

[22] Filed: Sept. 27, 1972

[21] Appl. No.: 292,590

[30] Foreign Application Priority Data
Oct. 4, 1971 France .............................. 71.35635

[52] U.S. Cl. .............................. 188/73.3; 188/71.1
[51] Int. Cl.² ......................................... F16D 65/02
[58] Field of Search ....... 188/71.1, 73.3, 73.4, 72.4, 188/72.5; 72/379

[56] References Cited
UNITED STATES PATENTS
2,118,948 5/1938 Schuyler et al. ...................... 72/379
2,123,842 7/1938 Cox ........................................ 72/379
3,580,361 5/1971 Eggstein et al. ................... 188/72.4

FOREIGN PATENTS OR APPLICATIONS
1,269,737 7/1961 France .............................. 188/73.3

Primary Examiner—George E. A. Halvosa
Attorney, Agent, or Firm—Ken C. Decker; William N. Antonis

[57] ABSTRACT

The invention relates to improvements to a fixed support for a disc brake. According to the invention, the fixed support is formed in one piece from a metal sheet containing a central orifice, the sheet being, before forming of the support, in the form of two mutually facing, substantially C-shaped members F1, F2, connected at their ends by connecting portions J, J', lines of least resistance being formed at the joins between the connecting portions and the C-shaped members, the sheet then being bent along the lines of least resistance to form a U.

4 Claims, 9 Drawing Figures

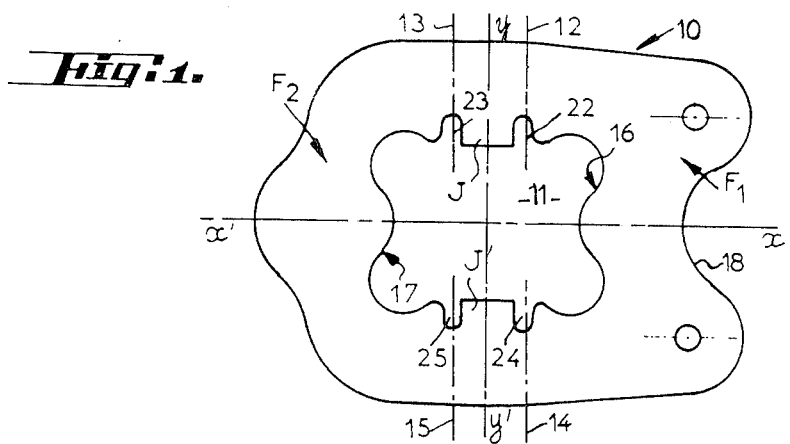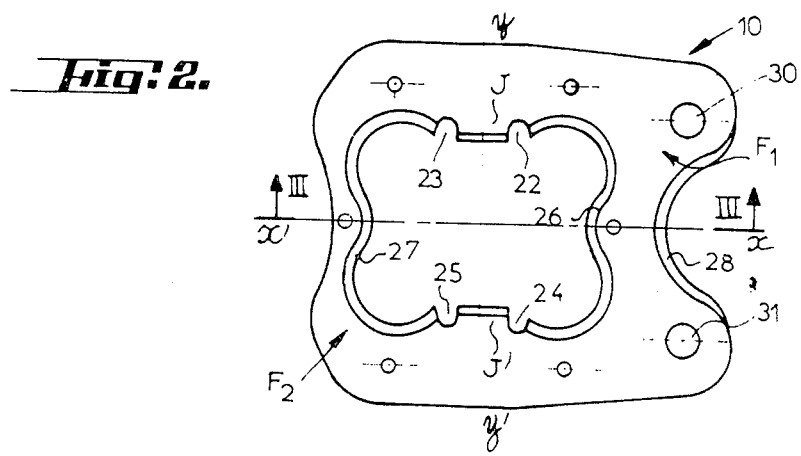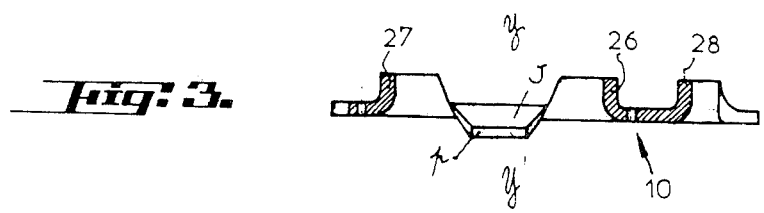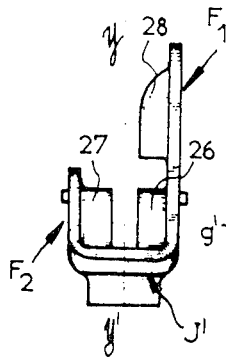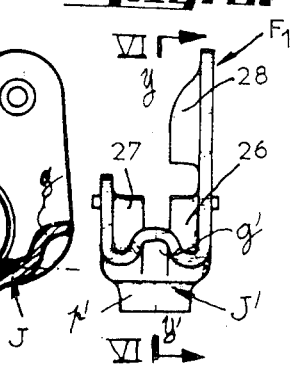

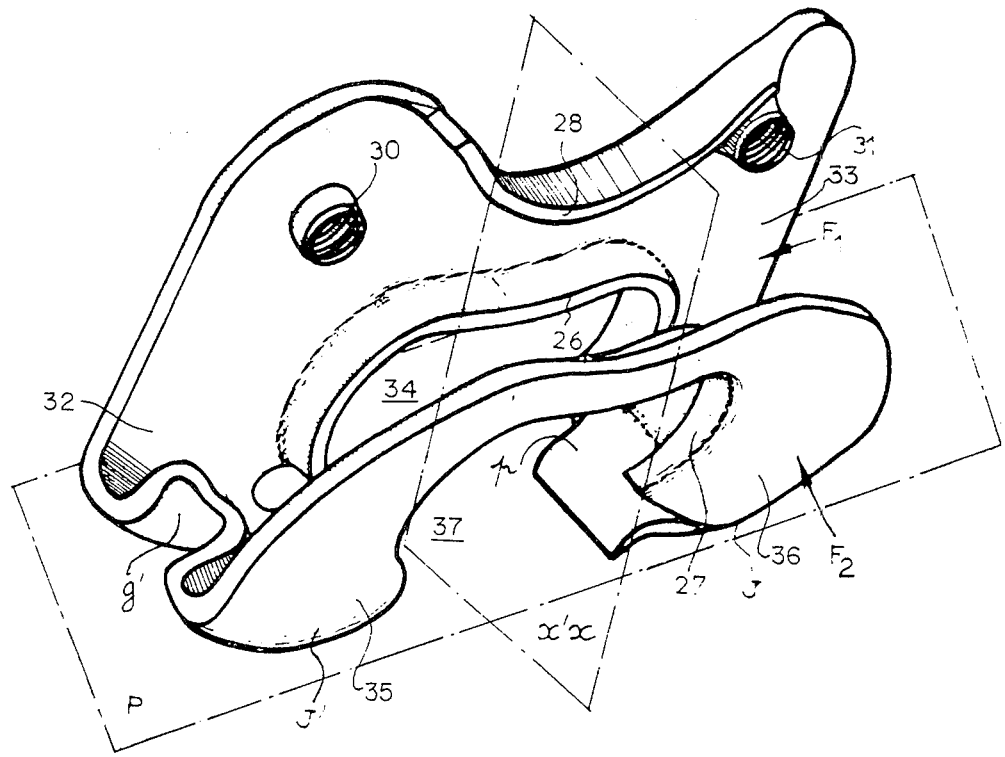
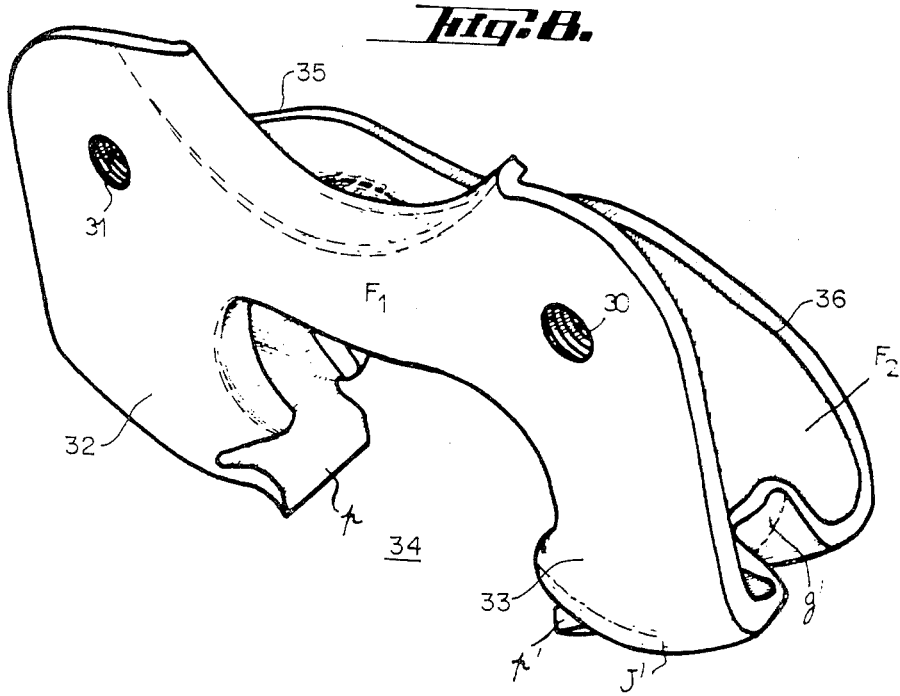

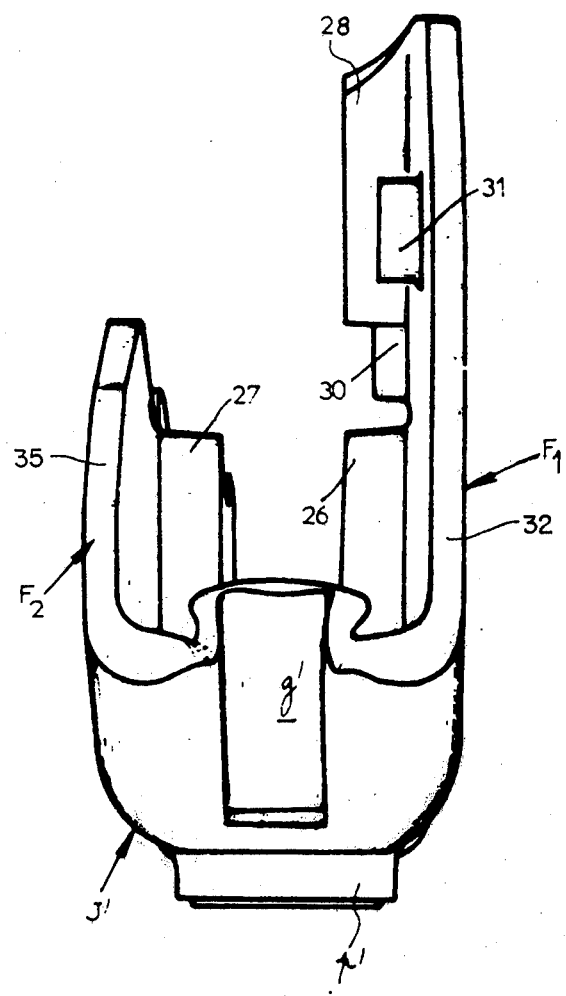

FIXED SUPPORT FOR A DISC BRAKE

The invention relates essentially to a disc brake having a fixed support which straddles the disc to guide the friction pads. More particularly it relates to improvements in the manufacture and design of such a fixed support.

In a disc brake the assembly comprising the mechanism for guiding and applying the friction pads is mounted on a fixed support, usually attached to the wheel hub. This fixed support has hitherto been made in two parts, situated on opposite sides of the disc and welded together substantially in the plane of the disc in that portion of the support which straddles the disc. If the support is to resist the mechanical braking forces to which it is subjected during braking, it must be reinforced at the join between the two parts. Supports of this type are therefore relatively complicated and troublesome to make.

According to the invention, the fixed support is formed in one piece from a metal sheet containing a central orifice, the sheet being, before forming of the support, in the form of two mutually facing, substantially C-shaped members connected at their ends by connecting portions, lines of least resistance being formed at the joins between the connecting portions and the C-shaped members, the edges of the central orifice being turned over, at least partially, substantially at right-angles towards the interior of the support at the level of the inner edges of the C-shaped members, and the sheet then being bent along the lines of least resistance to form a U, so that the support takes the form of two approxoimately parallel substantially C-shaped members, with raised inner edges, situated on opposite sides of the brake disc and joined at their ends by the connecting portions, which form spacers.

In a preferred embodiment the spacers are also formed in intaglio and in relief on both sides of a plane connecting the ends of the substantially C-shaped members, to increase the mechanical strength and rigidity around the connection between the two substantially C-shaped members forming the two support portions situated on opposite sides of the brake disc.

The resulting fixed support has exceptionally high mechanical strength and is lighter than the conventional fixed support. Its manufacture is of course considerably simpler, and its production costs are a fraction of those of the supports made by prior-art methods. Also, production control procedures are much easier to carry out because the support is formed from a sheet of known quality which, being cold worked, retains all its mechanical properties. In particular, this technique eliminates all difficulties and faults inherent in the use of a component made of two parts welded together.

The invention will be more clearly apparent from the ensuing description referring to the accompanying drawings, which are given by way of example only and in which:

FIG. 1 is a bottom view of a perforated metal sheet which is to be formed into a fixed disc-brake support embodying the invention;

FIG. 2 shows the element shown in FIG. 1 after it has undergone a first forming operation;

FIG. 3 represents a cross-section along a line III—III in FIG. 2;

FIG. 4 shows the element shown in FIGS. 2 and 3 after it has been bent into a U-shape;

FIG. 5 shows the element shown in FIG. 4 after the formation of reinforcing ribs in the connecting portions;

FIG. 6 represents a section along a line VI—VI in FIG. 5; and

FIG. 7 to 9 are three perspective views on a larger scale of the fixed support obtained as shown in FIGs. 5 and 6.

FIG. 1 shows a piece of metal sheet 10 which contains a central orifice 11 and which is to be formed by piercing, embossing and forming, preferably cold, into a fixed disc-brake support embodying the invention. Before the forming of the housing or frame, the sheet 10 is in the form of two substantially C-shaped members F1, F2 which face one another and are joined at their ends by connecting portions J, J', lines of least resistance 12 to 15 being formed at the joins between these portions and the C-shaped members. The orifice 11 may, for example, be produced by piercing. The lines of least resistance 12 to 14 are created by forming slots 22 to 25 at the joins between the ends of the C-shaped members F1, F2 and connecting portions J, J'.

In a second operation, illustrated in FIGS. 2 to 3, the inner edges 16, 17 of the C-shaped members F1, F2 are bordered or turned over to form reinforced rims 26, 27. Similarly, the edge 18 of the C-shaped member F1 may be bordered to form a reinforcement 28. Simultaneously (in the same operation) or subsequently the mutually facing free portions P, P' of the connecting portions J, J' are raised or turned over in the opposite direction from the rims 26 to 28 (FIG. 3).

As FIG. 4 shows, the next forming operation consists in bending the sheet 10 into a U-shape along the connecting lines 12, 14 and 13, 15 where the resistance is less due to the presence of the slots 22 to 25. The resulting fixed support is substantially in the form of a U formed by the two substantially C-shaped members F1 F2 situated on opposite sides of the central plane Y' Y of the brake disc (not shown), these members being joined by the connecting portions J, J'. The legs of the C-shaped member $F_1$ define a pair of circumferentially spaced arms 32, 33 defining a recess 34 therebetween. Similarly, the legs of the C-shaped member $F_2$ define a corresponding pair of circumferentially spaced arms 35, 36 defining a corresponding recess 37 therebetween. The connecting portions J, J' interconnect the upper edges of arms 32, 33 with the corresponding upper edges of arms 35, 36 respectively. The cylindrical surfaces of the rims 26, 27 are in alignment and will be able to receive correspondingly shaped friction pads designed to slide in them.

The following forming operation, illustrated in FIGS. 5 and 6, consists in forming ribs in intaglio in the connecting portions J, J' in order to reinforce them. More particularly, each connecting portion J, J' is formed substantially into a gutter or reinforcing strut (at g and g') opening towards the exterior of the support at the outer peripheral end of the connecting portion. As can be seen most clearly in FIG. 9, the depth of the gutters g, g' at the outer edge of the fixed support is substantially greater than at the other end of the gutter. Since the depth of the gutter is not uniform, the strut formed by the gutter resists distortion of the fixed support in all directions. The free ends p, p' of the connecting portions J, J' are faced on their outer edges to form parallel guide surfaces for the caliper which will straddle the assembly formed by the fixed support and pads.

In other words, the connecting portions J, J', which form spacers separating the two substantially C-shaped members F, F2 of the support, are formed in intaglio and in relief on both sides of a plane P (FIG. 6) passing through the ends of the C-shaped members F1, F2.

It will be noted that the resulting fixed support is of course symetrical relative to a central plane passing through the centres of the C-shaped members F1, F2.

Tapped holes 30, 31 are provided in bosses in view of the support being fixed to the vehicle axle.

Various additional sizing, piercing, milling and other operations may of course be carried out during forming and more particularly on the flat blank before it is bent to form the U-shaped housing.

I claim:

1. In a disc brake including a disc rotatable with a member to be braked, a U-shaped fixed support having a first member having a pair of circumferential arms defining a recess therebetween, said first member being located adjacent one side of the disc, a second member having a corresponding pair of circumferentially spaced arms defining a corresponding recess therebetween, said second member being located adjacent the other side of said disc, and a pair of connecting members straddling said disc and joining the circumferentially spaced arms on the one side of the disc with the circumferentially spaced arms on the other side of the disc, and gutters formed in each of said connecting members to define struts projecting toward the periphery of said disc, said gutters extending inwardly toward said recesses from corresponding opposite edges of said fixed support, the depth of said gutters at said corresponding opposite edges of the fixed support being unequal to the depth of the gutters at the ends thereof closest to said recesses.

2. The invention of claim 1:
   the depth of said gutters being maximum at the corresponding opposite edges of said fixed support and being minimum at the ends of the gutters closest to said recesses.

3. The invention of claim 2:
   said gutters being disposed in a plane parallel to the plane of the disc.

4. The invention of claim 2:
   said connecting members having a portion located between the ends of said gutters closest to the recesses and the edges of the recesses, said portion projecting upwardly away from the periphery of the rotor and away from the upper edges of said circumferentially spaced arms.

* * * * *